(12) United States Patent
Yang et al.

(10) Patent No.: US 7,362,592 B2
(45) Date of Patent: *Apr. 22, 2008

(54) SWITCHING CONTROL CIRCUIT FOR PRIMARY-SIDE CONTROLLED POWER CONVERTERS

(75) Inventors: Ta-yung Yang, Milpitas, CA (US);
Guo-Kiang Hung, Sindian (TW);
Jenn-yu G. Lin, Taipei (TW);
Chuh-Ching Li, Jhongli (TW);
Shao-Wei Chiu, Luo Yang Village Yanpu Township, Pingtung County (TW)

(73) Assignee: System General Corp., Taipei Hsien (TW)

( * ) Notice: Subject to any disclaimer, the term of this patent is extended or adjusted under 35 U.S.C. 154(b) by 163 days.

This patent is subject to a terminal disclaimer.

(21) Appl. No.: 10/943,318

(22) Filed: Sep. 16, 2004

(65) Prior Publication Data

US 2006/0056204 A1    Mar. 16, 2006

(51) Int. Cl.
*H02M 3/335* (2006.01)
(52) U.S. Cl. .............................. 363/21.13; 363/21.16; 363/21.18; 363/97
(58) Field of Classification Search ............. 363/21.05, 363/21.08, 21.09, 21.1, 21.13, 21.16, 21.17, 363/21.18, 97, 131
See application file for complete search history.

(56) References Cited

U.S. PATENT DOCUMENTS

| | | | | | |
|---|---|---|---|---|---|
| 5,032,967 | A | * | 7/1991 | Marinus et al. ........... | 363/21.13 |
| 5,901,051 | A | * | 5/1999 | Takahashi et al. ........ | 363/21.18 |
| 5,903,452 | A | * | 5/1999 | Yang ............................ | 363/97 |
| 6,078,510 | A | * | 6/2000 | Spampinato et al. ..... | 363/21.13 |
| 6,118,675 | A | * | 9/2000 | Lionetto et al. .......... | 363/21.13 |
| 6,545,882 | B2 | * | 4/2003 | Yang ......................... | 363/21.08 |
| 6,611,439 | B1 | * | 8/2003 | Yang et al. ..................... | 363/41 |
| 6,661,679 | B1 | * | 12/2003 | Yang et al. ..................... | 363/41 |
| 6,674,656 | B1 | * | 1/2004 | Yang et al. ................. | 363/21.1 |
| 6,744,649 | B1 | * | 6/2004 | Yang et al. ..................... | 363/98 |
| 6,836,415 | B1 | * | 12/2004 | Yang et al. .............. | 363/21.01 |
| 6,842,350 | B2 | * | 1/2005 | Yamada et al. ........... | 363/21.16 |
| 6,853,563 | B1 | * | 2/2005 | Yang et al. ............... | 363/21.15 |
| 6,862,194 | B2 | * | 3/2005 | Yang et al. ..................... | 363/16 |
| 6,912,141 | B2 | * | 6/2005 | Konno ........................ | 363/49 |
| 6,977,824 | B1 | * | 12/2005 | Yang et al. ............... | 363/21.16 |
| 7,016,204 | B2 | * | 3/2006 | Yang et al. ............... | 363/21.13 |
| 7,054,170 | B2 | * | 5/2006 | Yang et al. ............... | 363/21.18 |
| 7,061,225 | B2 | * | 6/2006 | Yang et al. ............... | 324/103 P |
| 7,061,780 | B2 | * | 6/2006 | Yang et al. ............... | 363/21.16 |
| 7,088,598 | B2 | * | 8/2006 | Yang et al. ............... | 363/21.01 |

* cited by examiner

*Primary Examiner*—Jeffrey Sterrett
(74) *Attorney, Agent, or Firm*—J.C. Patents (57) ABSTRACT

The present invention discloses a switching control circuit for a primary-side controlled power converter. A voltage-waveform detector produces a voltage-feedback signal and a discharge-time signal. A current-waveform detector generates a current-waveform signal by measuring a primary-side switching current. An integrator generates a current-feedback signal by integrating the current-waveform signal with the discharge time. A time constant of the integrator is correlated with the switching frequency, thus the current-feedback signal is proportional to an output current of the power converter. A PWM circuit controls the pulse width of the switching signal in response to the outputs of a voltage-loop error amplifier and a current-loop error amplifier. The output voltage and the maximum output current of the power converter are therefore regulated.

17 Claims, 11 Drawing Sheets

SWITCHING CONTROL CIRCUIT FOR PRIMARY-SIDE CONTROLLED POWER CONVERTERS

BACKGROUND OF THE INVENTION

1. Field of the Invention

The present invention relates to a control circuit for a power converter, and more specifically, to a switching control circuit for switching mode power converters.

2. Description of Related Art

Various power converters have been widely used to provide regulated voltage and current. For the sake of safety, an off-line power converter must provide galvanic isolation between its primary side and secondary side. When a control circuit is equipped at the primary side of a power converter, an optical-coupler and a secondary-side regulator are needed to regulate the output voltage and output current. The object of the present invention is to provide a switching control circuit for controlling the output voltage and the output current of a power converter at the primary side without the optical-coupler and secondary-side regulator. Furthermore, frequency hopping is developed for spreading the switching frequency of the switching signal and reducing the EMI (electric and magnetic interference). Therefore, the size and the cost of the power converter can be effectively reduced.

SUMMARY OF THE INVENTION

A switching control circuit for a primary-side-controlled power converter comprises a switching device to switch a transformer. A switching signal drives the switching device for regulating an output voltage and a maximum output current of the power converter. A controller is coupled to the transformer and a current-sense device to generate a voltage-feedback signal and a current-feedback signal by sampling a voltage signal and a discharge time of the transformer during the off-time of the switching signal, and measuring a current signal of the transformer during the on-time of the switching signal. The switching signal is generated in response to the voltage-feedback signal and the current-feedback signal.

The controller further comprises a voltage-waveform detector for multi-sampling the voltage signal and producing the voltage-feedback signal and a discharge-time signal. The voltage-waveform detector is connected to an auxiliary winding of a transformer through a resistor of a voltage divider. The discharge-time signal represents the discharge time of the transformer and stands for the discharge time of a secondary-side switching current. A current-waveform detector generates a current-waveform signal by measuring the current signal. An oscillator generates an oscillation signal for determining a switching frequency of the switching signal. An integrator is used for generating the current-feedback signal by integrating the current-waveform signal with the discharge time. A first operational amplifier and a first reference voltage develop a voltage-loop error amplifier to amplify the voltage-feedback signal and provide a loop gain for output voltage control. A second operational amplifier and a second reference voltage form a current-loop error amplifier to amplify the current-feedback signal and provide a loop gain for output current control. A PWM circuit associates with a first comparator and a second comparator to control the pulse width of the switching signal in response to the output of the voltage-loop error amplifier and the output of the current-loop error amplifier. A programmable current source is connected to the input of the voltage-waveform detector for temperature compensation. The programmable current source produces a programmable current in response to the temperature of the controller, which compensates the temperature deviation of the power converter.

A pattern generator generates a digital pattern code. A first programmable capacitor is coupled to the oscillator and the pattern generator for modulating the switching frequency in response to the digital pattern code. The spectrum of the switching frequency is extended, thus the EMI of the power converter is reduced. A second programmable capacitor is coupled to the integrator and the pattern generator for correlating a time constant of the integrator with the switching frequency. The current-feedback signal is therefore proportional to the output current of the power converter. The capacitance of the first programmable capacitor and the second programmable capacitor are controlled by the digital pattern code.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE EMBODIMENTS

Figure 1:
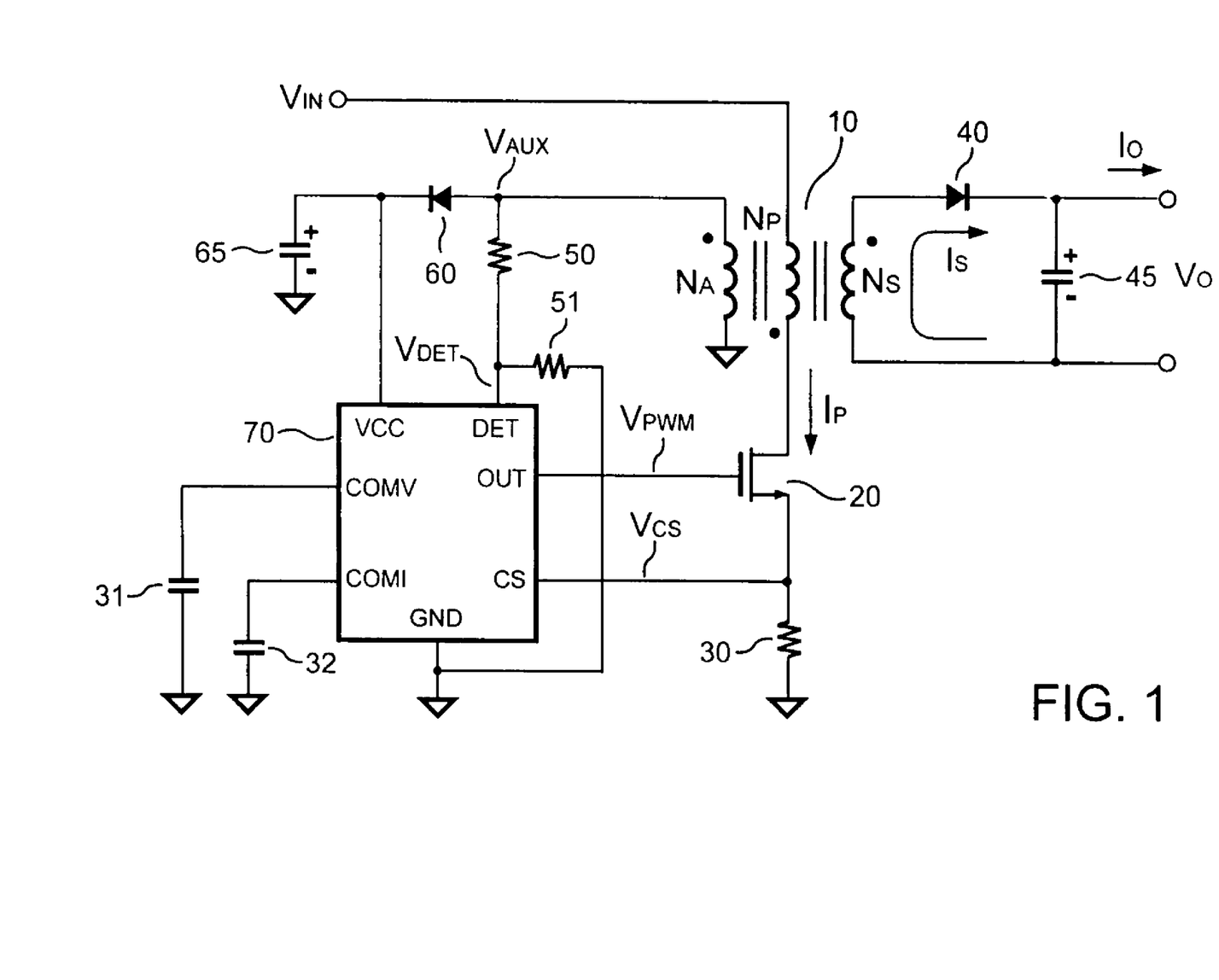
FIG. 1 shows a schematic diagram of a power converter having a switching control circuit.

FIG. 1 shows a power converter. The power converter includes a transformer 10 having an auxiliary winding $N_A$, a primary winding $N_P$, and a secondary winding $N_S$. The primary winding $N_P$ is supplied with an input voltage $V_{IN}$ of the power converter. In order to regulate an output voltage $V_O$ and an output current $I_O$ of the power converter, a controller 70 generates a switching signal $V_{PWM}$, which controls a switching device, such as a transistor 20, to switch the transformer 10. A current-sense resistor 30 serves as a current-sense device.

Figure 2:
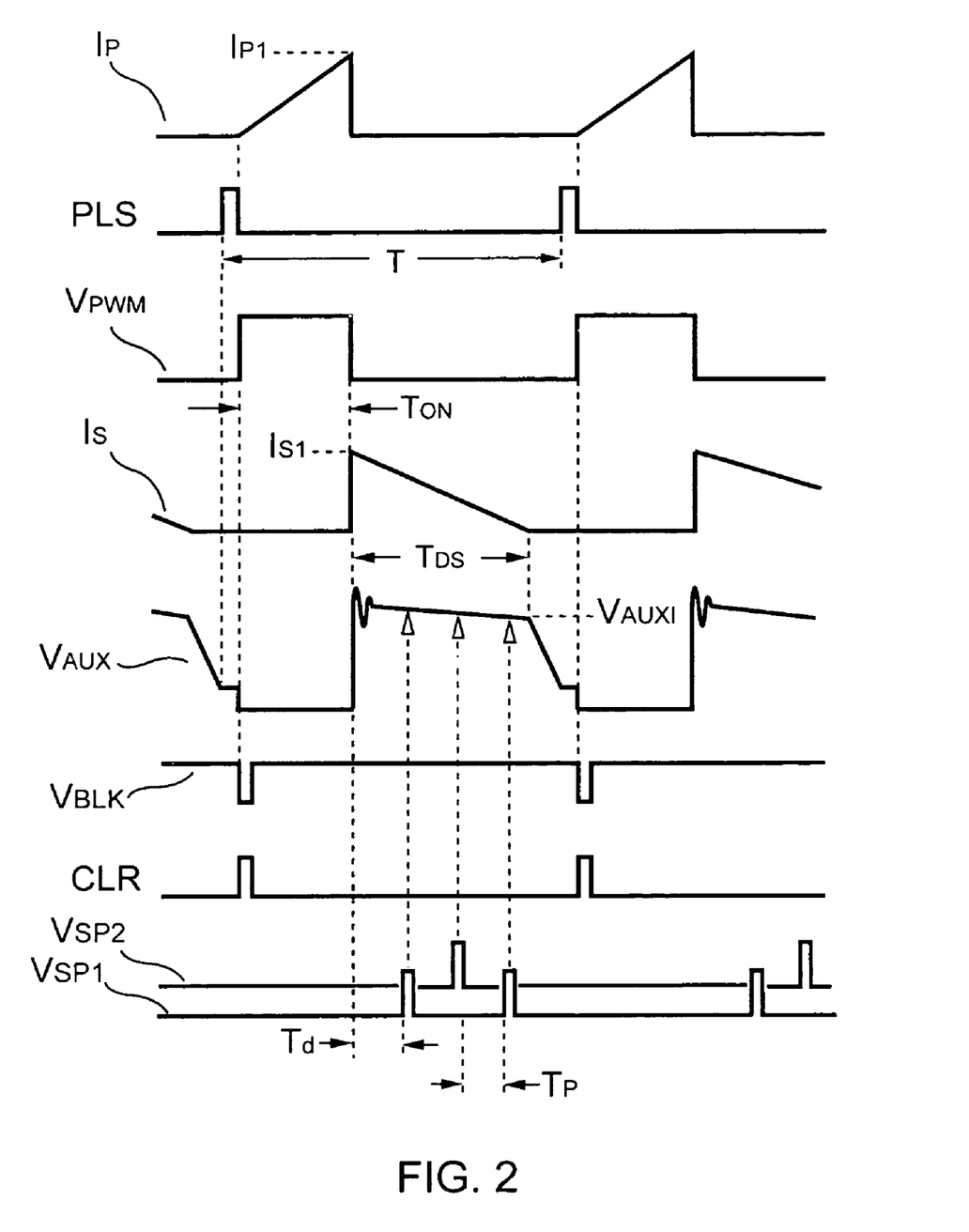
FIG. 2 shows key waveforms of the power converter and the switching control circuit.

FIG. 2 shows various signal waveforms of the power converter in FIG. 1. As the switching signal $V_{PWM}$ becomes logic-high, a primary-side switching current $I_P$ will be generated accordingly. A peak value $I_{P1}$ of a primary-side switching current $I_P$ can be given by, $$I_{P1} = \frac{V_{IN}}{L_P} \times T_{ON} \quad (1)$$

where $L_P$ is the inductance of the primary winding $N_P$ of the transformer 10; $T_{ON}$ is an on-period of the switching signal $V_{PWM}$.

Once the switching signal $V_{PWM}$ becomes logic-low, the energy stored in the transformer 10 will be delivered to the secondary side of the transformer 10 and to an output of the power converter via a rectifier 40. Therefore, a secondary-side switching current $I_S$ is generated accordingly. A peak value $I_{S1}$ of a secondary-side switching current $I_S$ can be expressed by, $$I_{S1} = \frac{(V_O + V_F)}{L_S} \times T_{DS} \quad (2)$$

where $V_O$ is the output voltage of the power converter; $V_F$ is a forward voltage drop of the rectifier 40; $L_S$ is the inductance of the secondary winding $N_S$ of the transformer 10; $T_{DS}$ is a discharge time of the secondary-side switching current Is.

Meanwhile, a voltage signal $V_{AUX}$ is generated at the auxiliary winding $N_A$ of the transformer 10. A voltage level $V_{AUX1}$ of the voltage signal $V_{AUX}$ is shown as, $$V_{AUX1} = \frac{T_{NA}}{T_{NS}} \times (V_O + V_F) \quad (3)$$

where $T_{NA}$ and $T_{NS}$ are respectively the winding turns of the auxiliary winding $N_A$ and the secondary winding $N_S$ of the transformer 10.

The voltage signal $V_{AUX}$ starts to decrease as the secondary-side switching current $I_S$ drops to zero. This also indicates that the energy of the transformer 10 is fully released at this moment. Therefore, as shown in FIG. 2, the discharge time $T_{DS}$ in equation (2) can be measured from a falling edge of the switching signal $V_{PWM}$ to a point that the voltage signal $V_{AUX}$ starts to fall. The secondary-side switching current $I_S$ is determined by the primary-side switching current $I_P$ and the winding turns of the transformer 10. The secondary-side switching current $I_S$ can be expressed by, $$I_S = \frac{T_{NP}}{T_{NS}} \times I_P \quad (4)$$

where $T_{NP}$ is the winding turns of the primary winding $N_P$ of the transformer 10.

The controller 70 comprises a supply terminal VCC and a ground terminal GND for receiving power. A resistor 50 and a resistor 51 are connected in series to form a voltage divider, which is connected between the auxiliary winding $N_A$ of the transformer 10 and a ground reference level. A detection terminal DET of the controller 70 is connected to a joint of the resistor 50 and the resistor 51. A voltage $V_{DET}$ generated at the detection terminal DET can be given by, $$V_{DET} = \frac{R_{51}}{R_{50} + R_{51}} \times V_{AUX} \quad (5)$$

where $R_{50}$ and $R_{51}$ are respectively the resistance of resistors 50 and 51.

The voltage signal $V_{AUX}$ further charges a capacitor 65 via a rectifier 60 for powering the controller 70. The current-sense resistor 30 is connected from a source of the transistor 20 to the ground reference level for converting the primary-side switching current $I_P$ to a current signal $V_{CS}$. A sense terminal CS of the controller 70 is connected to the current-sense resistor 30 for detecting the current signal $V_{CS}$.

An output terminal OUT of the controller 70 generates the switching signal $V_{PWM}$ to switch the transformer 10. A compensation network is connected to a voltage-compensation terminal COMV of the controller 70 for voltage-loop frequency compensation. The compensation network can be a capacitor connected to the ground reference level, such as a capacitor 31. Another compensation network is connected to a current-compensation terminal COMI of the controller 70 for current-loop frequency compensation. The compensation network can also be a capacitor connected to the ground reference level, such as a capacitor 32.

Figure 3:
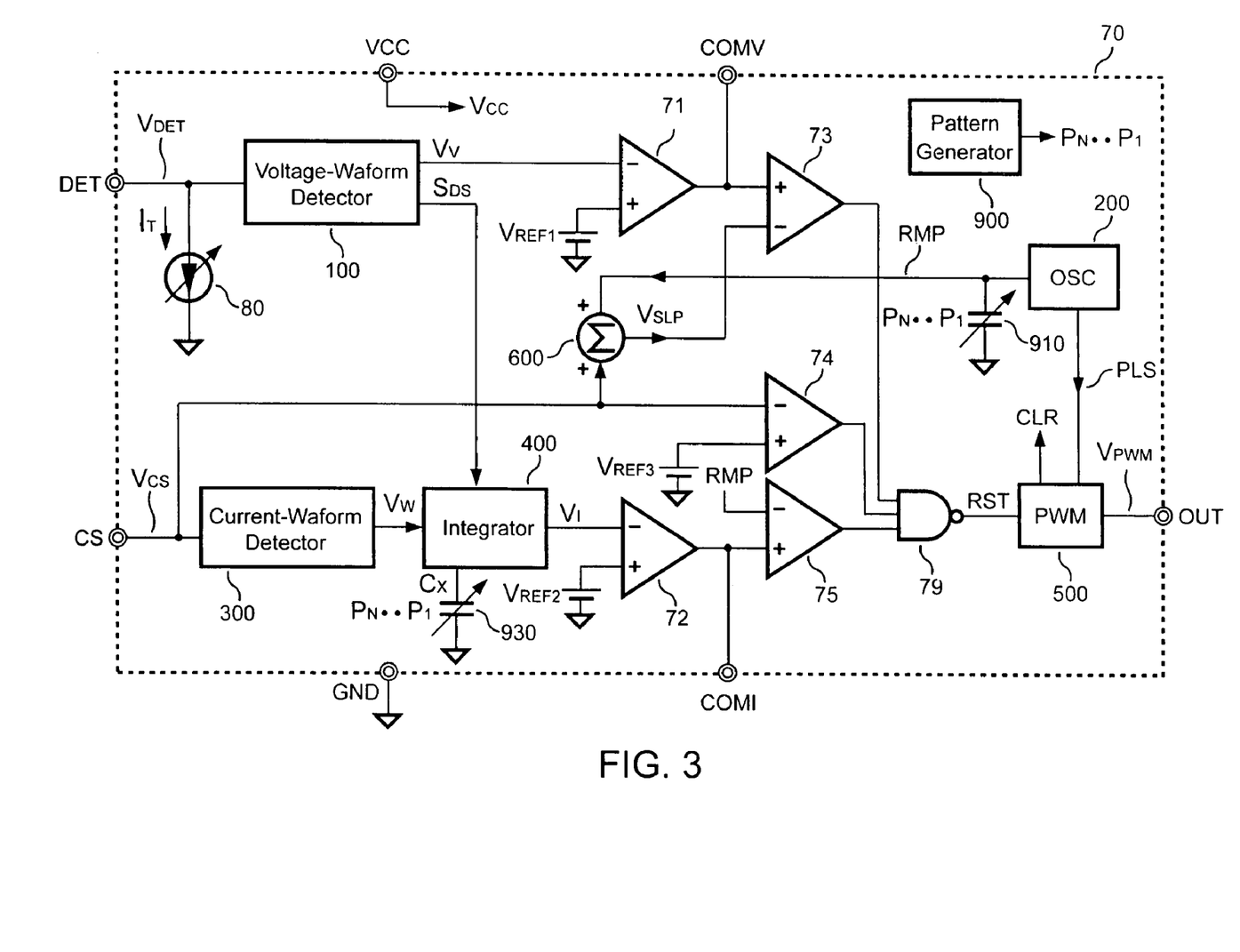
FIG. 3 shows an embodiment of a controller according to the present invention.

FIG. 3 shows an embodiment of the controller 70. A voltage-waveform detector 100 produces a voltage-feedback signal $V_V$ and a discharge-time signal $S_{DS}$ by multi-sampling the voltage $V_{DET}$. The discharge-time signal $S_{DS}$ represents the discharge time $T_{DS}$ of the secondary-side switching current $I_S$. A current-waveform detector 300 generates a current-waveform signal $V_W$ by measuring the current signal $V_{CS}$. An oscillator 200 generates an oscillation signal PLS for determining a switching frequency of the switching signal $V_{PWM}$. An integrator 400 produces a current-feedback signal $V_I$ by integrating the current-waveform signal $V_W$ with the discharge time $T_{DS}$. An operational amplifier 71 and a reference voltage $V_{REF1}$ develop a voltage-loop error amplifier for amplifying the voltage-feedback signal $V_V$ and providing a loop gain for output voltage control. An operational amplifier 72 and a reference voltage $V_{REF2}$ develop a current-loop error amplifier for amplifying the current-feedback signal $V_I$ and providing a loop gain for output current control.

A switching circuit 500 associates with comparators 73 and 75 to control the pulse width of the switching signal $V_{PWM}$ in response to the outputs of the voltage-loop error amplifier and the current-loop error amplifier. Both operational amplifiers 71 and 72 have trans-conductance output. An output of the operational amplifier 71 is connected to the voltage-compensation terminal COMV and a positive input of the comparator 73. An output of the operational amplifier 72 is connected to the current-compensation terminal COMI and a positive input of the comparator 75. A negative input of the comparator 73 is connected to an output of an adder 600. A negative input of the comparator 75 is supplied with a ramp signal RMP that is produced from the oscillator 200.

The adder 600 generates a slope signal $V_{SLP}$ by adding the current signal $V_{CS}$ with the ramp signal RMP, which forms a slope compensation for the voltage-loop. A positive input of a comparator 74 is supplied with a reference voltage $V_{REF3}$. A negative input of the comparator 74 is connected to the sense terminal CS for achieving a cycle-by-cycle current limit. Three inputs of a NAND gate 79 are respectively connected to the outputs of comparators 73, 74 and 75. An output of the NAND gate 79 generates a reset signal RST. The reset signal is applied to the PWM circuit 500 for controlling the duty cycle of the switching signal $V_{PWM}$.

A current control loop is formed from the detection of the primary-side switching current $I_P$ to the pulse width modulation of the switching signal $V_{PWM}$ for controlling the magnitude of the primary-side switching current $I_P$ in response to the reference voltage $V_{REF1}$. The secondary-side switching current $I_S$ is a ratio of the primary-side switching current $I_P$ as shown in equation (4). According to the signal waveforms in FIG. 2, the output current $I_O$ of the power converter is the average of the secondary-side switching current $I_S$. It can be expressed by, $$I_O = I_S \times \frac{T_{DS}}{2T} \quad (6)$$

Therefore, the output current $I_O$ of the power converter is regulated.

The current-waveform detector 300 detects the current signal $V_{CS}$ and generates the current-waveform signal $V_W$. The integrator 400 further produces the current-feedback signal $V_I$ by integrating the current-waveform signal $V_W$ with the discharge time $T_{DS}$. The current-feedback signal $V_1$ is thus designed as, $$V_1 = \frac{V_W}{2} \times \frac{T_{DS}}{T_1} \quad (7)$$

where the current-waveform signal $V_W$ is expressed as, $$V_W = \frac{T_{NS}}{T_{NP}} \times R_S \times I_S \quad (8)$$

where $T_I$ is a time constant of the integrator 400.

It can be seen from equations (6)-(8), the current-feedback signal $V_I$ can be rewritten as, $$V_1 = \frac{T}{T_1} \times \frac{T_{NS}}{T_{NP}} \times R_S \times I_O \quad (9)$$

It can be found that the current-feedback signal $V_I$ is proportional to the output current $I_O$ of the power converter. The current-feedback signal $V_I$ is increased as the output current $I_O$ increases. A maximum value of the current-feedback signal $V_I$ is limited to the value of the reference voltage $V_{REF2}$ through the regulation of the current control loop. Under feedback control of the current control loop, a maximum output current $I_{O(max)}$ is given by, $$I_{O(max)} = \frac{T_{NP}}{T_{NS}} \times \frac{G_A \times G_{SW} \times V_{REF2}}{1 + \left(G_A \times G_{SW} \times \frac{R_S}{K}\right)} \quad (10)$$

where K is a constant equal to $T_I/T$; $G_A$ is the gain of the current-loop error amplifier; $G_{SW}$ is the gain of the switching circuit.

As the loop gain of the current control loop is high ($G_A \times G_{SW} \gg 1$), the maximum output current $I_{O(max)}$ could be briefly defined as, $$I_{O(max)} = K \times \frac{T_{NP}}{T_{NS}} \times \frac{V_{REF}}{R_S} \quad (11)$$

The maximum output current $I_{O(max)}$ of the power converter is thus regulated as a constant current in response to the reference voltage $V_{REF2}$.

Besides, a voltage control loop is developed from the voltage signal $V_{AUX}$ sampling to the pulse width modulation of the switching signal $V_{PWM}$, which controls the magnitude of the voltage signal $V_{AUX}$ in response to the reference voltage $V_{REF1}$. The voltage signal $V_{AUX}$ is a ratio of the output voltage $V_O$ as shown in equation (3). The voltage signal $V_{AUX}$ is further attenuated to the voltage $V_{DET}$ as shown in equation (5). The voltage-waveform detector 100 generates the voltage-feedback signal $V_V$ through multi-sampling the voltage $V_{DET}$. The value of the voltage-feedback signal $V_V$ is controlled in response to the value of the reference voltage $V_{REF1}$ through the regulation of the voltage control loop. The voltage-loop error amplifier and the switching circuit provide the loop gain for the voltage control loop. Therefore the output voltage $V_O$ can be briefly defined as, $$V_O = \left(\frac{R_{50} + R_{51}}{R_{50}} \times \frac{T_{NS}}{T_{NA}} \times V_{REF1}\right) - V_F \quad (12)$$

The voltage signal $V_{AUX}$ is multi-sampled by the voltage-waveform detector 100. The voltage is sampled and measured instantly before the secondary-side switching current $I_S$ drops to zero. Therefore the variation of the secondary-side switching current $I_S$ does not affect the value of the forward voltage drop $V_F$ of the rectifier 40. However, the voltage drop $V_F$ of the rectifier 40 varies when temperature changes. A programmable current source 80 is connected to an input of the voltage-waveform detector 100 for temperature compensation. The programmable current source 80 produces a programmable current $I_T$ in response to the temperature of the controller 70. The programmable current $I_T$ associates with the resistors 50, 51 to generate a voltage $V_T$ to compensate the temperature variation of the forward voltage drop $V_F$ of the rectifier 40.

$$V_T = I_T \times \frac{R_{50} \times R_{51}}{R_{50} + R_{51}} \quad (13)$$

Referring to equations (12) and (13), we can find the ratio of resistors $R_{50}$ and $R_{51}$ determines the output voltage $V_O$. The resistance of resistors $R_{50}$ and $R_{51}$ determine the temperature coefficient for compensating the voltage drop $V_F$ of the rectifier 40. Based on the programmable current source 80, the equation (12) can be rewritten as, $$V_O = \left(\frac{R_{50} + R_{51}}{R_{50}} \times \frac{T_{NS}}{T_{NA}} \times V_{REF1}\right) - V_F + V_T \qquad (14)$$

Furthermore, in order to produce frequency hopping for reducing the EMI of the power converter, a pattern generator 900 generates a digital pattern code $P_N \ldots P_1$. A first programmable capacitor 910 is coupled to the oscillator 200 and the pattern generator 900 for modulating the switching frequency of the switching signal $V_{PWM}$ in response to the digital pattern code $P_N \ldots P_1$. A second programmable capacitor 930 is coupled to the integrator 400 and the pattern generator 900 for correlating the time constant $T_1$ of the integrator 400 with the switching frequency. The capacitance of the first programmable capacitor 910 and the second programmable capacitor 930 are controlled by the digital pattern code $P_N \ldots P_1$.

Figure 10:
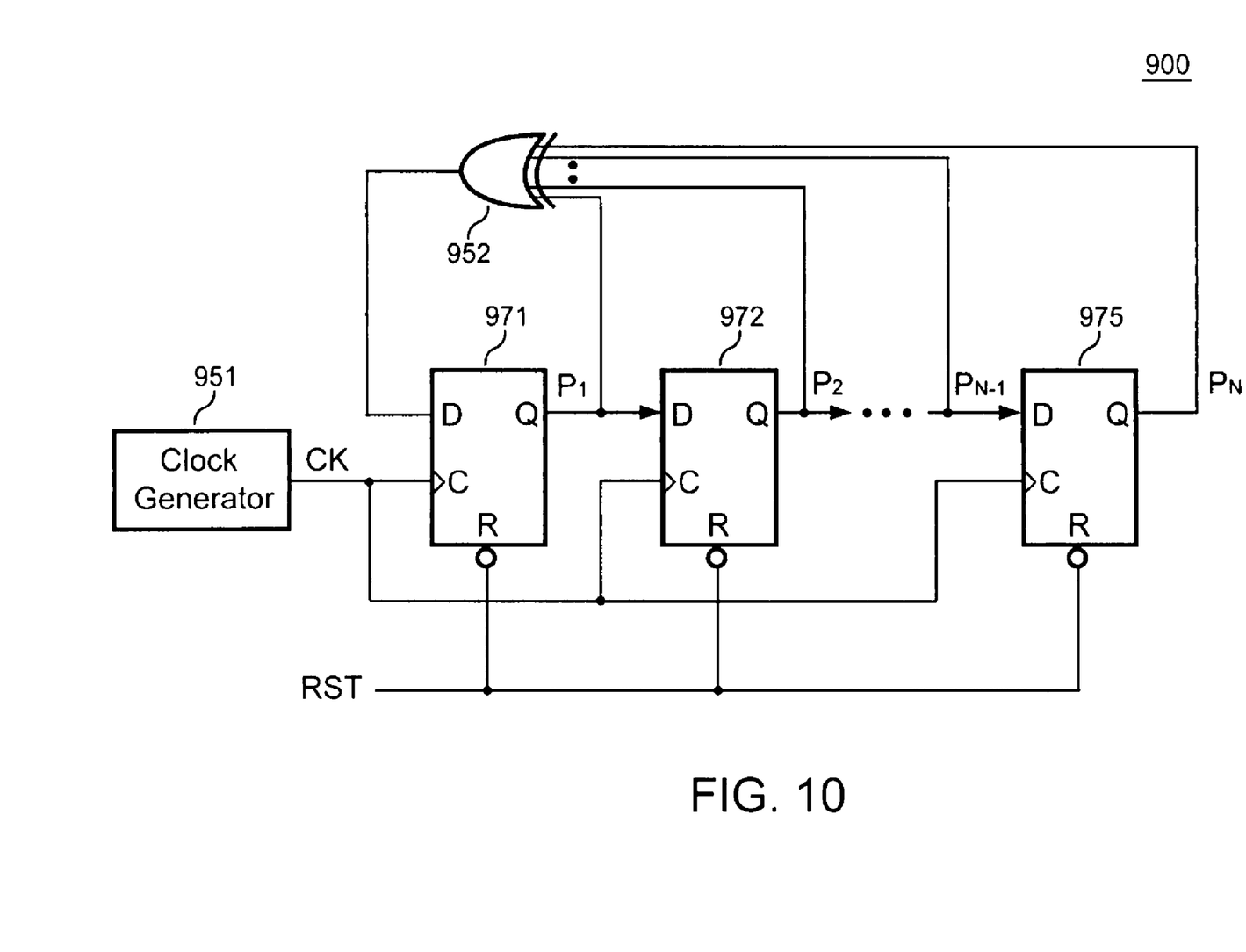
FIG. 10 shows an embodiment of a pattern generator according to the present invention.

FIG. 10 shows an embodiment of the pattern generator 900 according to the present invention. A clock generator 951 generates a clock signal CK. A plurality of registers 971, 972 . . . 975 and a XOR gate 952 develop a linear shift register for generating a linear code in response to the clock signal CK. The inputs of the XOR gate 952 determine the polynomials of the linear shift register and decide the output of the linear shift register. The digital pattern code $P_N \ldots P_1$ can be obtained from the part of the linear code to optimize the application.

Figure 4:
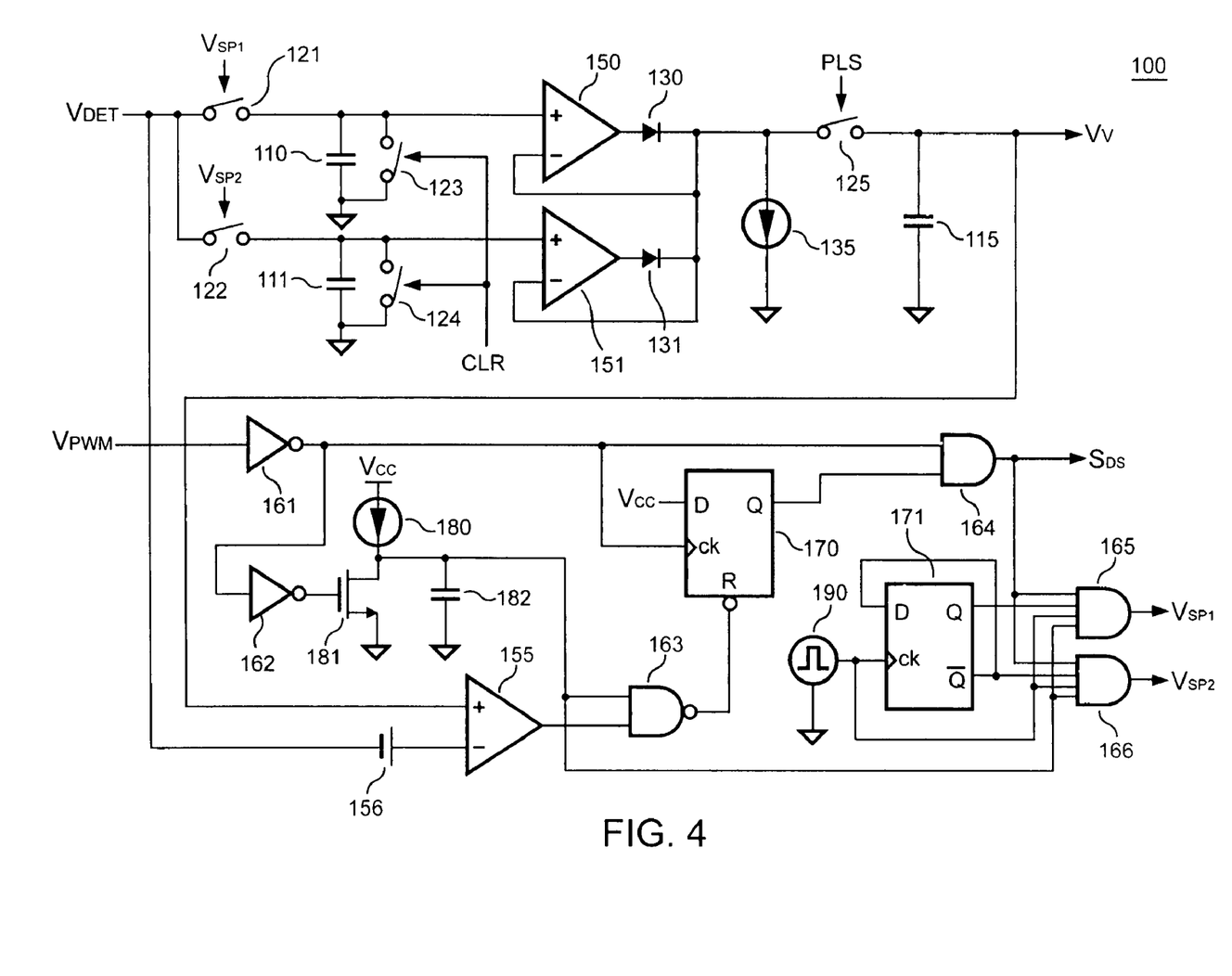
FIG. 4 shows an embodiment of a voltage-waveform detector according to the present invention.

FIG. 4 shows an embodiment of the voltage-waveform detector 100 according to the present invention. A sample-pulse generator 190 produces a sample-pulse signal for multi-sampling operation. A threshold voltage 156 adds to the voltage signal $V_{AUX}$ to produce a level-shift signal. A first signal generator includes a D flip-flop 171, two AND gates 165, 166 for producing a first sample signal $V_{SP1}$ and a second sample signal $V_{SP2}$. A second signal generator comprises a D flip-flop 170, a NAND gate 163, an AND gate 164 and a comparator 155 for producing the discharge-time signal $S_{DS}$. A time-delay circuit includes an inverter 162, a current source 180, a transistor 181 and a capacitor 182 for generating a delay time $T_d$ as the switching signal $V_{PWM}$ is disabled. An input of an inverter 161 is supplied with the switching signal $V_{PWM}$. An output of the inverter 161 is connected to an input of the inverter 162, a first input of the AND gate 164 and a clock-input of the D flip-flop 170. An output of the inverter 162 turns on/off the transistor 181. The capacitor 182 is connected in parallel with the transistor 181. The current source 180 is applied to charge the capacitor 182. Therefore the current of the current source 180 and the capacitance of the capacitor 182 decide the delay time $T_d$ of the time-delay circuit. The capacitor 182 is the output of the time-delay circuit. A D-input of the D flip-flop 170 is pulled high by a supply voltage $V_{CC}$. An output of the D flip-flop 170 is connected to a second input of the AND gate 164. The AND gate 164 outputs the discharge-time signal $S_{DS}$. The discharge-time signal $S_{DS}$ is thus enabled as the switching signal $V_{PWM}$ is disabled. The output of the NAND gate 163 is connected to a reset-input of the D flip-flop 170. The inputs of the NAND gate 163 are connected to the output of the time-delay circuit and an output of the comparator 155. A negative input of the comparator 155 is supplied with the level-shift signal. A positive input of the comparator 155 is supplied with the voltage-feedback signal $V_V$. Therefore, after the delay time $T_d$, the discharge-time signal $S_{DS}$ can be disable once the level-shift signal is lower than the voltage-feedback signal $V_V$. Besides, the discharge-time signal $S_{DS}$ can also be disabled as long as the switching signal $V_{PWM}$ is enabled.

The sample-pulse signal is supplied to a clock-input of the D flip-flop 171 and third inputs of AND gates 165 and 166. A D-input and an inverse output of the D flip-flop 171 are connected together to form a divided-by-two counter. An output and the inverse output of the D flip-flop 171 are respectively connected to second inputs of AND gates 165 and 166. First inputs of AND gates 165 and 166 are both supplied with the discharge-time signal $S_{DS}$. Fourth inputs of AND gates 165 and 166 are connected to the output of the time-delay circuit. Therefore the first sample signal $V_{SP1}$ and the second sample signal $V_{SP2}$ are generated in response to the sample-pulse signal. Besides, the first sample signal $V_{SP1}$ and the second sample signal $V_{SP2}$ are alternately produced during an enabled period of the discharge-time signal $S_{DS}$. However, the delay time $T_d$ is inserted at the beginning of the discharge-time signal $S_{DS}$ to inhibit the first sample signal $V_{SP1}$ and the second sample signal $V_{SP2}$. The first sample signal $V_{SP1}$ and the second sample signal $V_{SP2}$ are thus disabled during the period of the delay time $T_d$.

The first sample signal $V_{SP1}$ and the second sample signal $S_{SP2}$ are used for alternately sampling the voltage signal $V_{AUX}$ via the detection terminal DET and the divider. The first sample signal $V_{SP1}$ and the second sample signal $V_{SP2}$ control a switch 121 and a switch 122 for obtaining a first hold voltage and a second hold voltage across a capacitor 110 and a capacitor 111 respectively. A switch 123 is connected in parallel with the capacitor 110 to discharge the capacitor 110. A switch 124 is connected in parallel with the capacitor 111 to discharge the capacitor 111. A buffer amplifier includes operational amplifiers 150 and 151, diodes 130,131, a current source 135 for generating a hold voltage. The positive inputs of operational amplifiers 150 and 151 are connected to the capacitor 110 and capacitor 111 respectively. The negative inputs of the operational amplifiers 150 and 151 are connected to an output of the buffer amplifier. The diode 130 is connected from an output of the operational amplifier 150 to the output of the buffer amplifier. The diode 131 is connected from an output of the operational amplifier 151 to the output of the buffer amplifier. The hold voltage is thus obtained from the higher voltage of the first hold voltage and the second hold voltage. The current source 135 is used for the termination. A switch 125 periodically conducts the hold voltage to a capacitor 115 for producing the voltage-feedback signal $V_V$. The switch 125 is turned on/off by the oscillation signal PLS. The first sample signal $V_{SP1}$ and the second sample signal $V_{SP2}$ start to produce the first hold voltage and the second hold voltage after the delay time $T_d$, which eliminates the spike interference of the voltage signal $V_{AUX}$. The spike of the voltage signal $V_{AUX}$ would be generated when the switching signal $V_{PWM}$ is disabled and the transistor 20 is turned off.

The voltage signal $V_{AUX}$ starts to decrease as the secondary-side switching current $I_S$ drops to zero, which is detected by the comparator 155 to disable the discharge-time signal $S_{DS}$. The pulse width of the discharge-time signal $S_{DS}$ is therefore correlated to the discharge time $T_{DS}$ of the secondary-side switching current $I_S$ Meanwhile the first sample signal $V_{SP1}$ and the second sample signal $V_{SP2}$ are disabled, and the multi-sampling operation is stopped as the discharge-time signal $S_{DS}$ is disabled. At the moment, the hold voltage generated at the output of the buffer amplifier represents an end voltage. The end voltage is thus correlated to the voltage signal $V_{AUX}$ that is sampled just before the secondary-side switching current $I_S$ dropping to zero. The hold voltage is obtained from the higher voltage of the first hold voltage and the second hold voltage, which will ignore the voltage that is sampled when the voltage signal $V_{AUX}$ starts to decrease.

Figure 5:
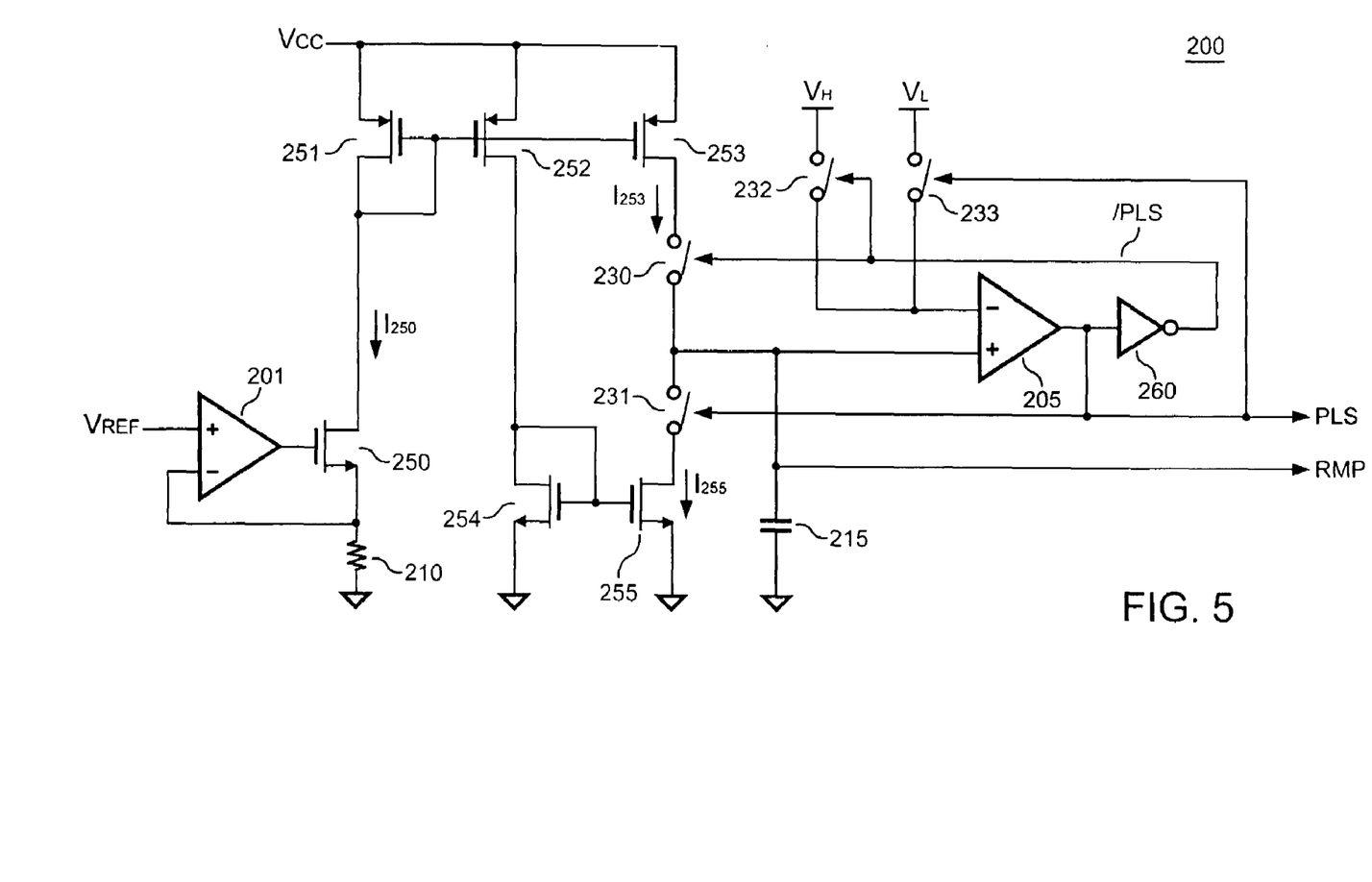
FIG. 5 shows an embodiment of an oscillator according to the present invention.

FIG. 5 shows an embodiment of the oscillator 200 according to the present invention. An operational amplifier 201, a resistor 210 and a transistor 250 form a first V-to-I converter. The first V-to-I converter generates a reference current $I_{250}$ in response to a reference voltage $V_{REF}$. A plurality of transistors, such as 251, 252, 253, 254, 255 form current mirrors for generating an oscillator charge current $I_{253}$ and an oscillator discharge current $I_{255}$ in response to the reference current $I_{250}$. A drain of the transistor 253 generates the oscillator charge current $I_{253}$. A drain of the transistor 255 generates the oscillator discharge current $I_{255}$. A switch 230 is connected between the drain of the transistor 253 and a capacitor 215. A switch 231 is connected between the drain of the transistor 255 and the capacitor 215. The ramp signal RMP is obtained across the capacitor 215. A comparator 205 has a positive input connected to the capacitor 215. The comparator 205 outputs the oscillation signal PLS. The oscillation signal PLS determines the switching frequency. A first terminal of a switch 232 is supplied with a high threshold voltage $V_H$. A first terminal of a switch 233 is supplied with a low threshold voltage $V_L$. A second terminal of the switch 232 and a second terminal of the switch 233 are both connected to a negative input of the comparator 205. An input of an inverter 260 is connected to an output of the comparator 205 for producing an inverse oscillation signal/PLS. The oscillation signal PLS turns on/off the switch 231 and the switch 233. The inverse oscillation signal/PLS turns on/off the switch 230 and the switch 232. The first programmable capacitor 910 in FIG. 3 is connected in parallel with the capacitor 215 for modulating the switching frequency in response to the digital pattern code $P_N \ldots P_1$. The resistance $R_{210}$ of the resistor 210, the capacitance $C_{215}$ of the capacitor 215 and the capacitance $C_{910}$ of the first programmable capacitor 910 determine the switching period T of the switching frequency. The switching period T is given by, $$T = \frac{(C_{215} + C910) \times V_{OSC}}{V_{REF}/R_{210}} = R_{210} \times (C_{215} + C910) \times \frac{V_{OSC}}{V_{REF}} \quad (15)$$

where $V_{OSC} = V_H - V_L$.

The capacitance $C_{910}$ of the first programmable capacitor 910 varies in response to the variation of the digital pattern code $P_N \ldots P_1$.

Figure 6:
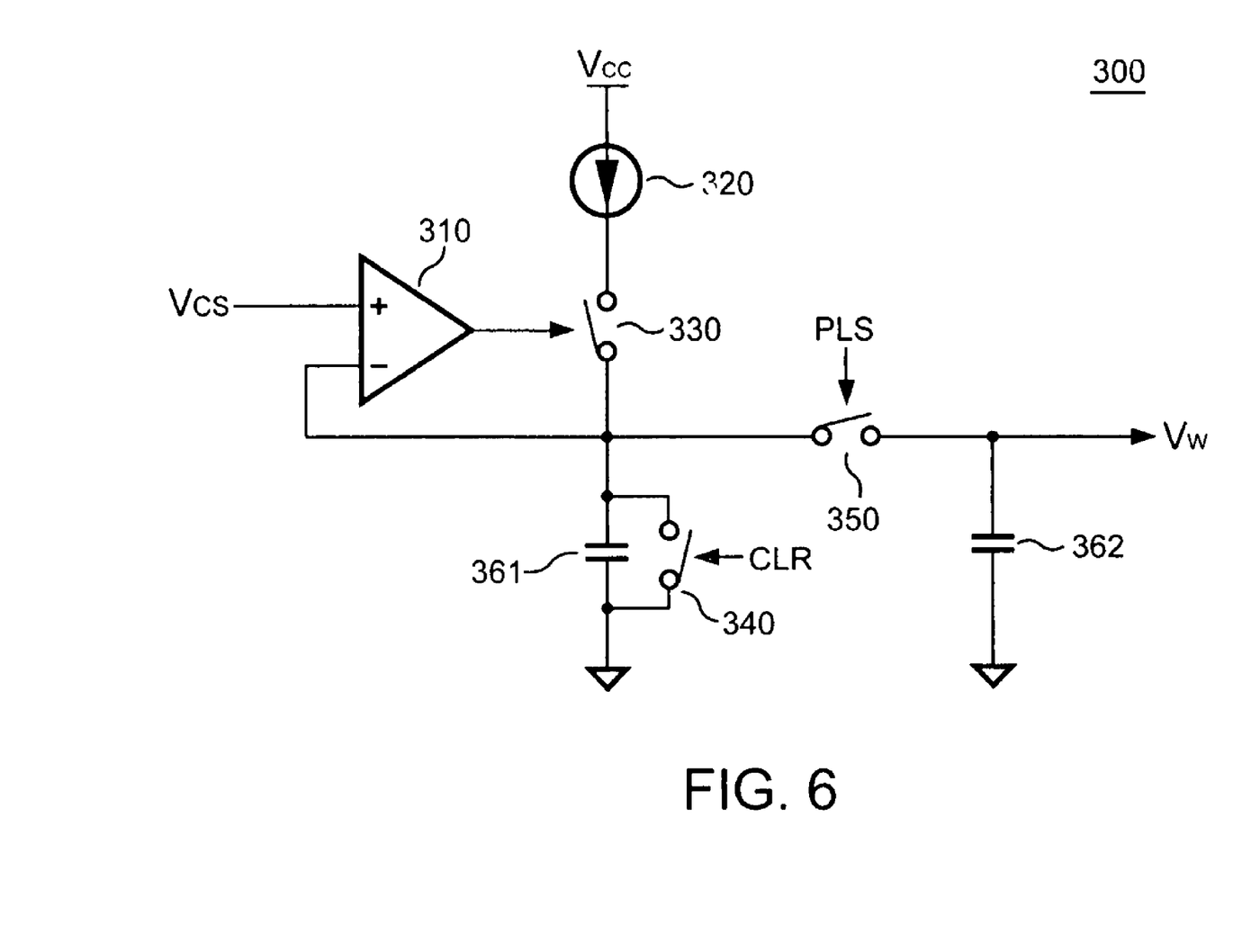
FIG. 6 shows an embodiment of a current-waveform detector according to the present invention.

FIG. 6 shows an embodiment of the current-waveform detector 300 according to the present invention. A peak detector includes a comparator 310, a current source 320, switches 330, 340, and a capacitor 361. The peak value of the current signal $V_{CS}$ is sampled for generating a peak-current signal. A positive input of the comparator 310 is supplied with the current signal $V_{CS}$. A negative input of the comparator 310 is connected to the capacitor 361. The switch 330 is connected between the current source 320 and the capacitor 361. The output of the comparator 310 turns on/off the switch 330. The switch 340 is connected in parallel with the capacitor 361 for discharging the capacitor 361. A switch 350 periodically conducts the peak-current signal to a capacitor 362 for producing the current-waveform signal $V_W$. The switch 350 is turned on/off by the oscillation signal PLS.

Figure 7:
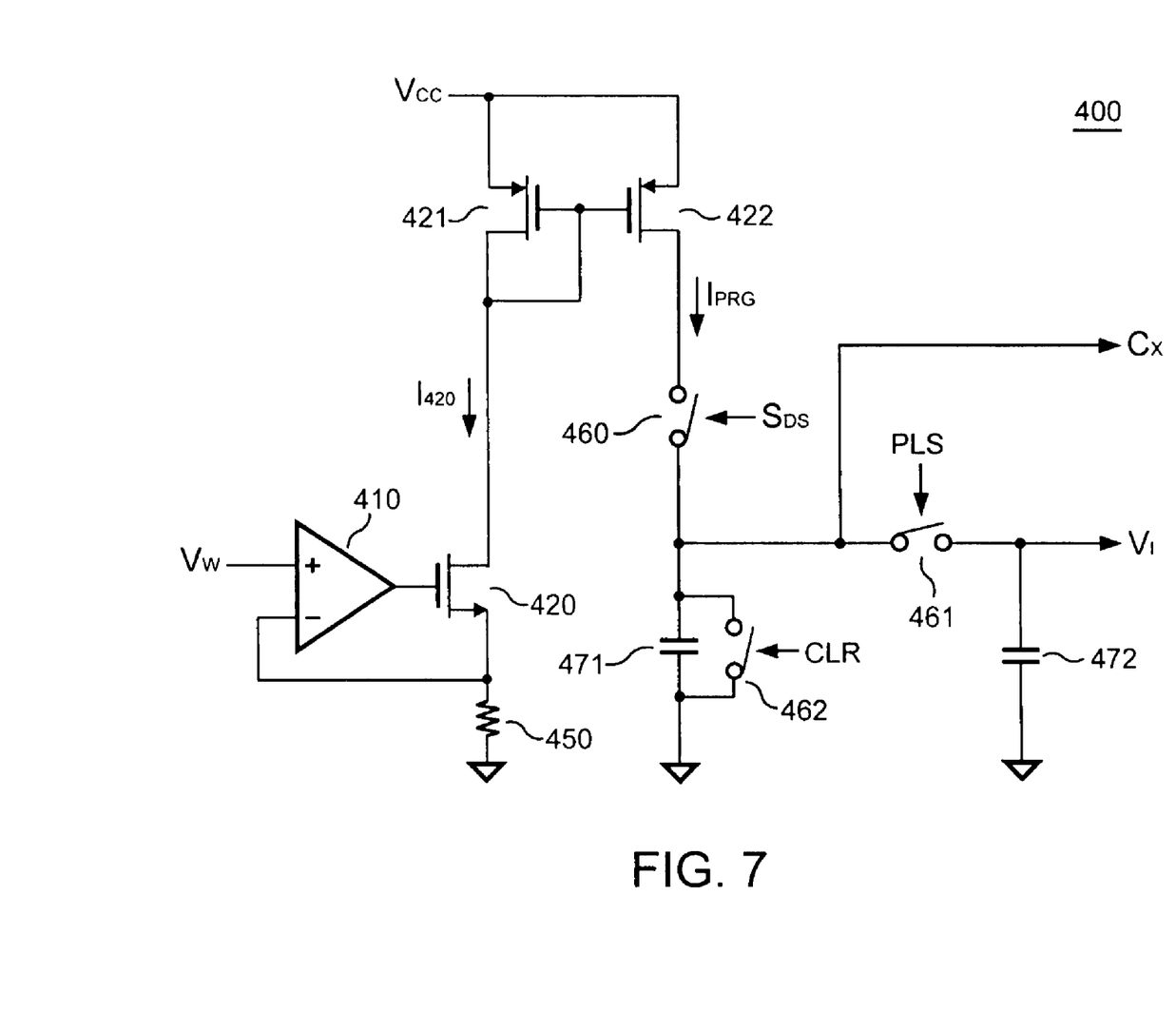
FIG. 7 shows an embodiment of an integrator according to the present invention.

FIG. 7 shows an embodiment of the integrator 400 according to the present invention. A second V-to-I converter comprises an operational amplifier 410, a resistor 450 and transistors 420, 421, and 422. A positive input of the operational amplifier 410 is supplied with the current-waveform signal $V_W$. A negative input of the operational amplifier 410 is connected to the resistor 450. An output of the operational amplifier 410 drives a gate of the transistor 420. A source of the transistor 420 is coupled to the resistor 450. The second V-to-I converter generates a current $I_{420}$ via a drain of the transistor 420 in response to the current-waveform signal $V_W$. Transistors 421 and 422 form a current mirror having a 2:1 ratio. The current mirror is driven by the current $I_{420}$ to produce a programmable charge current $I_{PRG}$ via a drain of the transistor 422. The programmable charge current $I_{PRG}$ can be expressed by, $$I_{PRG} = \frac{1}{R_{450}} \times \frac{V_W}{2} \quad (16)$$

where $R_{450}$ is the resistance of the resistor 450.

A capacitor 471 is used to produce an integrated signal. A switch 460 is connected between the drain of the transistor 422 and the capacitor 471. The switch 460 is turned on/off by the discharge-time signal $S_{DS}$. A switch 462 is connected in parallel with the capacitor 471 for discharging the capacitor 471. The second programmable capacitor 930 in FIG. 3 is connected in parallel with the capacitor 471 at a $C_X$ terminal of the integrator 400 for correlating the time constant $T_I$ of the integrator 400 with the switching frequency. The capacitance $C_{930}$ of the second programmable capacitor 930 varies in response to the variation of the digital pattern code $P_N \ldots P_1$. A switch 461 periodically conducts the integrated signal to a capacitor 472 for producing the current-feedback signal $V_I$. The switch 461 is turned on/off by the oscillation signal PLS. The current-feedback signal $V_I$ is therefore obtained across the capacitor 472.

$$V_I = \frac{1}{R_{450} \times (C_{471} + C_{930})} \times \frac{V_W}{2} \times T_{DS} \quad (17)$$

According to equations (4)-(7), the current-feedback signal $V_I$ is correlated to the secondary-side switching current $I_S$ and the output current $I_O$ of the power converter. Thus, equation (9) can be rewritten as, $$V_1 = m \times \frac{T_{NS}}{T_{NP}} \times R_S \times I_O \quad (18)$$

where m is a constant which is determined by, $$m = \frac{R_{210} \times (C_{215} + C_{910})}{R_{450} \times (C_{471} + C_{930})} \times \frac{V_{OSC}}{V_{REF}} \quad (19)$$

The resistance $R_{450}$ of the resistor 450 is correlated to the resistance $R_{210}$ of the resistor 210. The capacitance $C_{471}$ of the capacitor 471 and the capacitance $C_{930}$ of the capacitor 930 are correlated to the capacitance $C_{215}$ of the capacitor 215 and the capacitance $C_{910}$ of the capacitor 910. Therefore, the current-feedback signal $V_I$ is proportional to the output current $I_O$ of the power converter.

Figure 8:
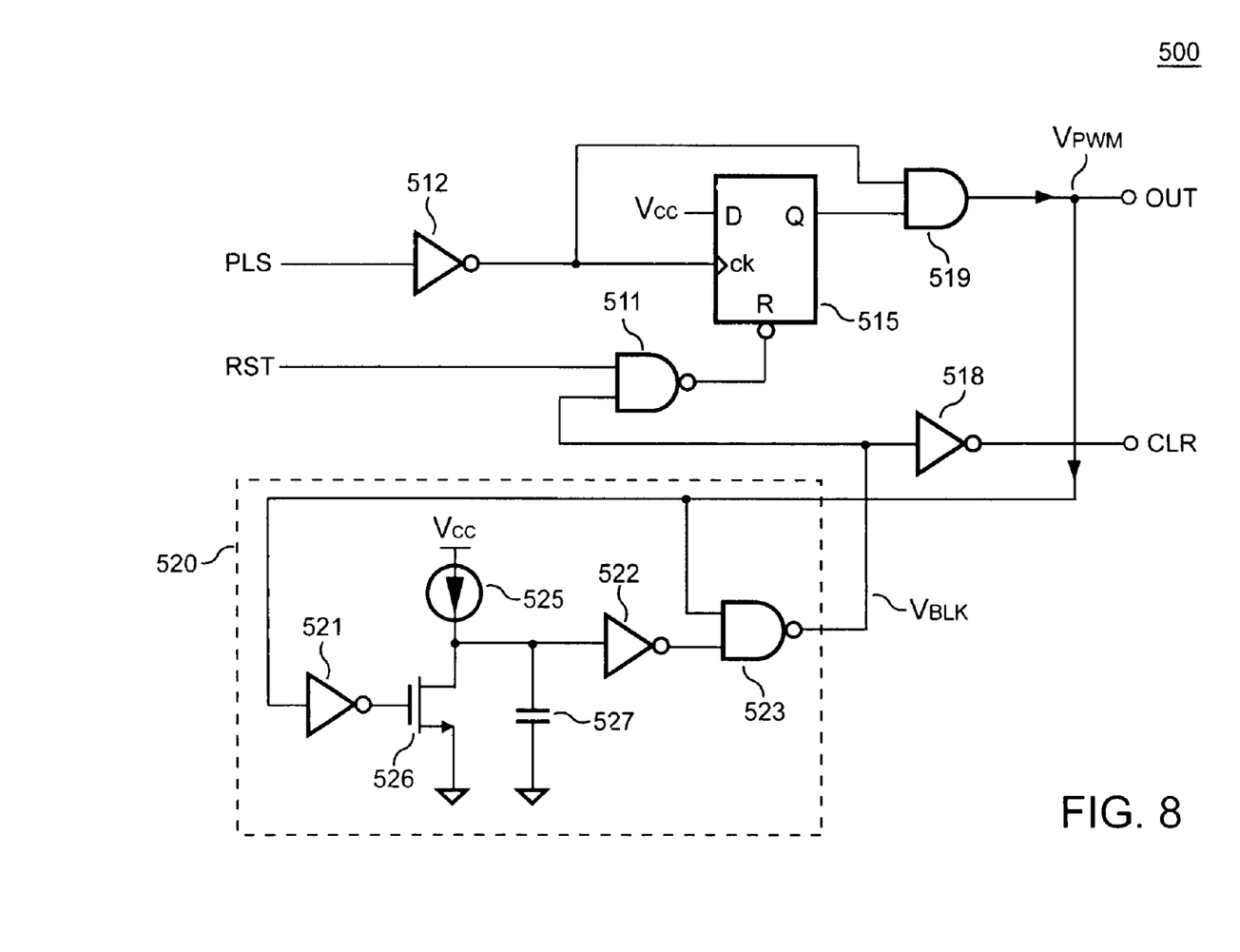
FIG. 8 shows an embodiment of a PWM circuit according to the present invention.

FIG. 8 shows a schematic diagram of the PWM circuit 500 according to the present invention. The PWM circuit 500 includes a NAND gate 511, a D flip-flop 515, an AND gate 519, a blanking circuit 520 and inverters 512 and 518. A D-input of the D flip-flop 515 is pulled high by the supply voltage $V_{CC}$. The oscillation signal PLS drives an input of the inverter 512. An output of the inverter 512 is connected to a clock-input of the D flip-flop 515 for enabling the switching signal $V_{PWM}$. An output of the D flip-flop 515 is connected to a first input of the AND gate 519. A second input of the AND gate 519 is coupled to the output of the inverter 512. The AND gate 519 outputs the switching signal $V_{PWM}$. A reset-input of the D flip-flop 515 is driven by an output of the NAND gate 511. A first input of the NAND gate 511 is supplied with the reset signal RST for cycle-by-cycle disabling the switching signal $V_{PWM}$. The second input of the NAND gate 511 is connected to an output of the blanking circuit 520 for ensuring a minimum on-time of the switching signal $V_{PWM}$ once the switching signal $V_{PWM}$ is enabled. The minimum on-time of the switching signal $V_{PWM}$ will secure a minimum value of the discharge time $T_{DS}$, which will ensure a proper multi-sampling operation for sampling voltage signal $V_{AUX}$ in the voltage-waveform detector 100. The discharge time $T_{DS}$ is related to the on-period of the switching signal $V_{PWM}$. Referring to equations (1), (2), (4) and the secondary inductance $L_S$, which is given by equation (20), the discharge time $T_{DS}$ can be expressed as equation (21), $$L_S = \left(\frac{T_{NS}}{T_{NP}}\right)^2 \times L_P \qquad (20)$$

$$T_{DS} = \left(\frac{V_{IN}}{V_O + V_F}\right) \times \frac{T_{NS}}{T_{NP}} \times T_{ON} \qquad (21)$$

where $T_{ON}$ is the on-time of the switching signal $V_{PWM}$.

An input of the blanking circuit 520 is supplied with the switching signal $V_{PWM}$. When the switching signal $V_{PWM}$ is enabled, the blanking circuit 520 will generate a blanking signal $V_{BLK}$ to inhibit the reset of the D flip-flop 515. The blanking circuit 520 comprises a NAND gate 523, a current source 525, a capacitor 527, a transistor 526 and inverters 521 and 522. The switching signal $V_{PWM}$ is supplied to an input of the inverter 521 and a first input of the NAND gate 523. The current source 525 is applied to charge the capacitor 527. The capacitor 527 is connected between a drain and a source of the transistor 526. An output of the inverter 521 turns on/off the transistor 526. An input of the inverter 522 is coupled to the capacitor 527. An output of the inverter 522 is connected to a second input of the NAND gate 523. An output of the NAND gate 523 generates the blanking signal $V_{BLK}$. The current of the current source 525 and the capacitance of the capacitor 527 determine the pulse width of the blanking signal $V_{BLK}$. The input of an inverter 518 is connected to the output of the NAND gate 523. An output of the inverter 518 generates a clear signal CLR to turn on/off switches 123, 124, 340 and 462.

Figure 9:
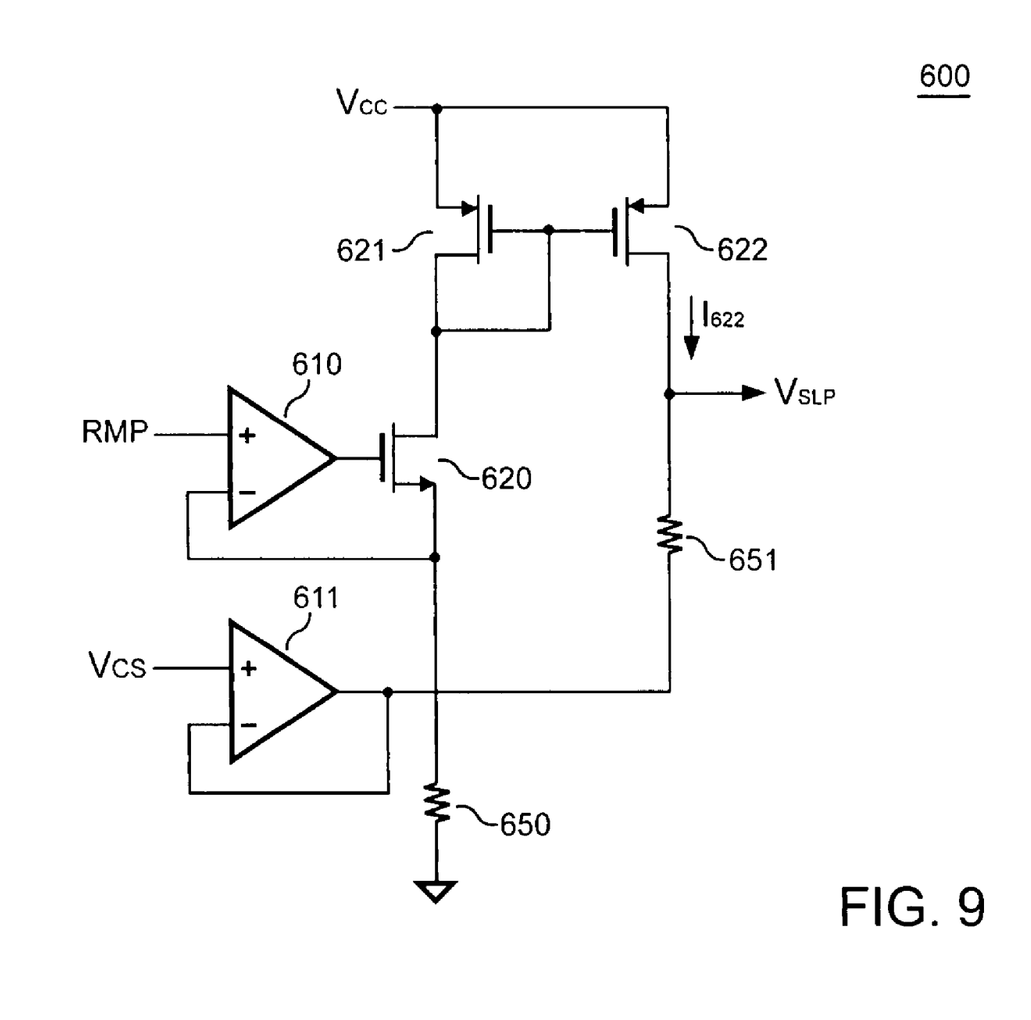
FIG. 9 shows an embodiment of an adder according to the present invention.

FIG. 9 shows a schematic diagram of the adder 600 according to the present invention. An operational amplifier 610, transistors 620, 621, 622 and a resistor 650 develop a third V-to-I converter for generating a current $I_{622}$ in response to the ramp signal RMP. A positive input of an operational amplifier 611 is supplied with the current signal $V_{CS}$. A negative input and an output of the operational amplifier 611 are connected together to build the operational amplifier 611 as a buffer. A drain of the transistor 622 is connected to the output of the operational amplifier 611 via a resistor 651. The slope signal $V_{SLP}$ is generated at the drain of the transistor 622. The slope signal $V_{SLP}$ is therefore correlated to the ramp signal RMP and the current signal $V_{CS}$.

Figure 11:
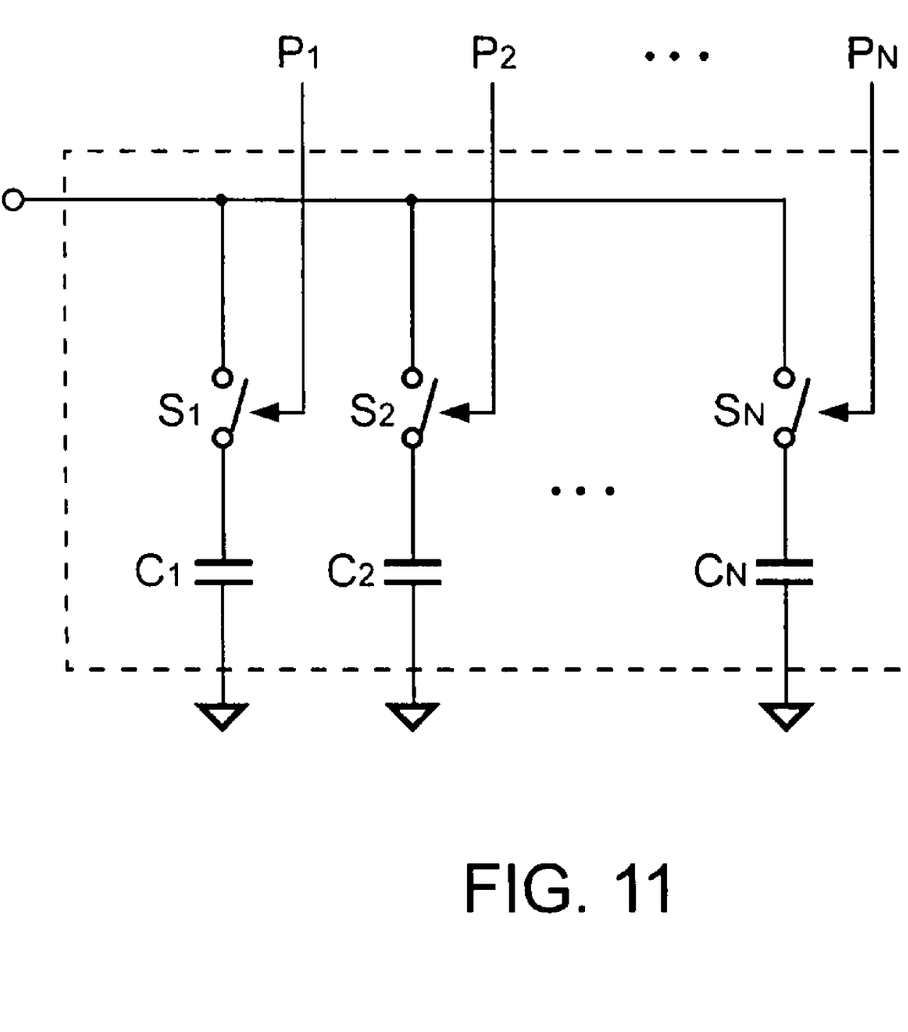
FIG. 11 shows an embodiment of a programmable capacitor according to the present invention.

FIG. 11 shows an embodiment of a programmable capacitor, such as the first programmable capacitor 910 and the second programmable capacitor 930. The programmable capacitor comprises switching-capacitor sets connected to each other in parallel. The switching-capacitor sets are respectively formed by capacitors $C_1, C_2, \ldots, C_N$ and switches $S_1, S_2, \ldots S_N$. The switch $S_1$ and the capacitor $C_1$ are connected in series. The switch $S_2$ and the capacitor $C_2$ are connected in series. The switch $S_N$ and the resistor $C_N$ are connected in series. The digital pattern code $P_N \ldots P_1$ controls switches $S_1, S_2, \ldots S_N$. Therefore, the capacitance of the programmable capacitor can be changed.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching control circuit for a primary-side controlled power converter, comprising:
    a switching device, for switching a transformer, wherein said transformer is supplied with an input voltage of the power converter;
    a switching signal, controlling said switching device for regulating an output voltage and a maximum output current of the power converter; and
    a controller, coupled to said transformer and a current-sense device to generate a voltage-feedback signal and a current-feedback signal by sampling a voltage signal and a discharge time of said transformer during an off-time of said switching signal, and measuring a current signal of said transformer during an on-time of said switching signal, wherein said switching signal is generated in response to said voltage-feedback signal and said current-feedback signal.

2. The switching control circuit as claimed in claim 1, wherein said controller comprises:
    a voltage-waveform detector, coupled to said transformer, producing said voltage-feedback signal and a discharge-time signal by multi-sampling said voltage signal from an auxiliary winding of said transformer; wherein said discharge-time signal represents said discharge time of said transformer;
    a current-waveform detector, coupled to said current-sense device for generating a current-waveform signal by measuring said current signal; wherein said current signal is generated in response to a primary-side switching current of said transformer;
    an integrator, for producing said current-feedback signal by integrating said current-waveform signal with said discharge time;
    an oscillator, for generating an oscillation signal for determining a switching frequency of said switching signal;
    a voltage-loop error amplifier and a current-loop error amplifier, for amplifying said voltage-feedback signal and said current-feedback signal respectively; and a PWM circuit, for generating said switching signal in response to an output of said voltage-loop error amplifier and an output of said current-loop error amplifier.

3. The switching control circuit as claimed in claim 2, wherein said controller further comprises:
a programmable current source, connected to an input of said voltage-waveform detector for temperature compensation; wherein said programmable current source produces a programmable current in response to the temperature of said controller.

4. The switching control circuit as claimed in claim 2, wherein said voltage-waveform detector multi-samples said voltage signal to generate an end voltage for producing said voltage-feedback signal, wherein said end voltage is sampled and measured instantly before a secondary-side switching current of said transformer drops to zero.

5. The switching control circuit as claimed in claim 2, wherein a time constant of said integrator is correlated with a switching period of said switching signal.

6. The switching control circuit as claimed in claim 2, wherein said voltage-waveform detector comprises:
a sample-pulse generator, for producing a sample-pulse signal;
a threshold voltage, wherein said threshold voltage adds said voltage signal to produce a level-shift signal;
a first capacitor and a second capacitor;
a first signal generator, for generating a first sample signal and a second sample signal, wherein said first sample signal and said second sample signal are used for alternately sampling said voltage signal, wherein a first hold voltage and a second hold voltage are respectively held across said first capacitor and said second capacitor, wherein said first sample signal and said second sample signal are alternately generated in response to said sample-pulse signal during an enabled period of said discharge-time signal, wherein a delay time is inserted at the beginning of said discharge-time signal, wherein said first sample signal and said second sample signal are disabled during the period of said delay time;
a buffer amplifier, generating a hold signal from the higher voltage of said first hold voltage and said second hold voltage;
a first output capacitor, for generating said voltage-feedback signal by sampling said hold signal; and
a second signal generator, for producing said discharge-time signal, wherein said discharge-time signal is enabled as said switching signal is disabled, wherein after said delay time said discharge-time signal can be disabled as said level-shift signal is lower than said voltage-feedback signal, wherein said discharge-time signal can also be disabled as long as said switching signal is enabled.

7. The switching control circuit as claimed in claim 2, wherein said controller further comprises:
a pattern generator, for generating a digital pattern code;
a first programmable capacitor, coupled to said oscillator and said pattern generator for modulating said switching frequency in response to said digital pattern code; and
a second programmable capacitor, coupled to said integrator and said pattern generator for correlating a time constant of said integrator with said switching frequency; wherein the capacitance of said first programmable capacitor and said second programmable capacitor are controlled by said digital pattern code.

8. The switching control circuit as claimed in claim 7, wherein said pattern generator comprises:
a clock generator, for generating a clock signal; and
a linear-shift register, for generating said digital pattern code in response to said clock signal.

9. The switching control circuit as claimed in claim 7, wherein said oscillator comprises:
a first V-to-I converter, for generating an oscillator charge current and an oscillator discharge current, wherein said first V-to-I converter includes an oscillation operational amplifier, an oscillation resistor and oscillation transistors;
an oscillation capacitor, connected in parallel with said first programmable capacitor; a first oscillation switch, wherein a first terminal of said first oscillation switch is supplied with said oscillator charge current and a second terminal of said first oscillation switch is connected to said oscillation capacitor;
a second oscillation switch, wherein a first terminal of said second oscillation switch is connected to said oscillation capacitor and a second terminal of said second oscillation switch is driven by said oscillator discharge current;
an oscillation comparator, having a positive input connected to said oscillation capacitor, wherein said oscillation comparator generates said oscillation signal;
a third oscillation switch, having a first terminal supplied with a high threshold voltage and a second terminal connected to a negative input of said oscillation comparator;
a fourth oscillation switch, having a first terminal supplied with a low threshold voltage and a second terminal connected to said negative input of said oscillation comparator; and
an oscillation inverter, having an input connected to an output of said oscillation comparator for producing an inverse oscillation signal; wherein said oscillation signal turns on/off said second oscillation switch and said fourth oscillation switch, wherein said inverse oscillation signal turns on/off said first oscillation switch and said third oscillation switch.

10. The switching control circuit as claimed in claim 9, wherein said oscillation capacitor is connected in parallel with said first programmable capacitor, wherein said first programmable capacitor comprises oscillation switching capacitors, wherein said oscillation switching capacitors are turned on/off by said digital pattern code.

11. The switching control circuit as claimed in claim 2, wherein said current-waveform detector comprises:
a peak detector, for generating a peak-current signal by measuring a peak value of said current signal;
a third capacitor, for holding said peak-current signal;
a second output capacitor, for producing said current-waveform signal; and
a switch, for conducting said peak-current signal to said second output capacitor, wherein said switch is turned on/off by said oscillation signal.

12. The switching control circuit as claimed in claim 2, wherein said integrator comprises:
a second V-to-I converter, fanned by a timing operational amplifier, a timing resistor and timing transistors, wherein said second V-to-I converter generates a programmable charge current in response to said current-waveform signal;
a timing capacitor, connected in parallel with said second programmable capacitor, for producing an integrated signal;

a first switch, wherein a first terminal of said first switch is supplied with said programmable charge current and a second terminal of said first switch is connected to said timing capacitor, wherein said first switch is turned on/off by said discharge-time signal;

a second switch, connected in parallel with said timing capacitor for discharging said timing capacitor;

a third output capacitor, for generating said current-feedback signal; and a third switch, for conducting said integrated signal to said third output capacitor, wherein said third switch is turned on/off by said oscillation signal.

13. The switching control circuit as claimed in claim 1, wherein said switching signal has a minimum on-time once said switching signal is enabled, which further ensures a minimum value of said discharge time for multi-sampling said voltage signal.

14. A switching control circuit for a primary-side controlled power converter, comprising:

a switching device, for switching a transformer, wherein said transformer is supplied with an input voltage of the power converter;

a switching signal, controlling said switching device for regulating an output voltage of the power converter; and a controller, coupled to said transformer to generate a voltage-feedback signal by multi- sampling a voltage signal and a discharge time of said transformer during an off-time of said switching signal, wherein said switching signal is generated in response to said voltage-feedback signal.

15. The switching control circuit as claimed in claim 14, wherein said controller comprises:

a voltage-waveform detector, coupled to said transformer, producing said voltage-feedback signal and a discharge-time signal by multi-sampling said voltage signal from an auxiliary winding of said transformer, wherein said discharge-time signal represents said discharge time of said transformer;

an oscillator, for generating an oscillation signal For determining a switching frequency of said switching signal;

a voltage-loop error amplifier, for amplifying said voltage-feedback signal a current-loop error amplifier, for amplifying a current-feedback signal; and a PWM circuit for generating said switching signal in response to an output of said voltage-loop error amplifier and an output of said current-loop error amplifier.

16. The switching control circuit as claimed in claim 15, wherein said controller further comprises:

a programmable current source, connected to an input of said voltage-waveform detector for temperature compensation, wherein said programmable current source produces a programmable current in response to the temperature of said controller.

17. The switching control circuit as claimed in claim 15, wherein said controller further comprises:

a pattern generator, for generating a digital pattern code;

a first programmable capacitor, coupled to said oscillator and said pattern generator for modulating said switching frequency in response to said digital pattern code; and a second programmable capacitor, coupled to said integrator and said pattern generator for correlating a time constant of said integrator with said switching frequency, wherein the capacitance of said first programmable capacitor and said second programmable capacitor are controlled by said digital pattern code.

* * * * *